(12) United States Patent  
Landau et al.

(10) Patent No.: US 8,838,538 B1  
(45) Date of Patent: Sep. 16, 2014

(54) TECHNIQUES FOR REPLICATING CHANGES TO ACCESS CONTROL LISTS ON INVESTIGATIVE ANALYSIS DATA

(71) Applicant: Palantir Technologies, Inc., Palo Alto, CA (US)

(72) Inventors: Alexander Landau, Palo Alto, CA (US); Richard A. Ducott, Burlingame, CA (US); John K. Garrod, Palo Alto, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 13/956,326

(22) Filed: Jul. 31, 2013

(51) Int. Cl.  
*G06F 17/30* (2006.01)  
*G06F 7/00* (2006.01)  
*H04L 29/06* (2006.01)

(52) U.S. Cl.  
CPC .................................. *H04L 63/101* (2013.01)  
USPC ........................... 707/626; 707/613; 707/634

(58) Field of Classification Search  
CPC ..................... G06F 17/30215; G06F 17/30578  
See application file for complete search history.

(56) References Cited

U.S. PATENT DOCUMENTS

| | | | |
|---|---|---|---|
| 6,216,140 B1 | 4/2001 | Kramer | |
| 7,437,664 B2 | 10/2008 | Borson | |
| 2003/0182313 A1* | 9/2003 | Federwisch et al. | 707/200 |
| 2004/0111390 A1 | 6/2004 | Saito et al. | |
| 2009/0199090 A1 | 8/2009 | Poston et al. | |
| 2012/0016849 A1 | 1/2012 | Garrod et al. | |
| 2013/0191336 A1 | 7/2013 | Ducott, III et al. | |
| 2013/0191338 A1* | 7/2013 | Ducott et al. | 707/634 |

OTHER PUBLICATIONS

U.S. Appl. No. 12/836,801, filed Jul. 15, 2010, Notice of Allowance dated Apr. 16, 2013.

* cited by examiner

*Primary Examiner* — Sangwoo Ahn  
(74) *Attorney, Agent, or Firm* — Hickman Palermo Truong Becker Bingham Wong LLP; Adam C. Stone

(57) ABSTRACT

Techniques for replicating changes to access control lists on investigative analysis data are disclosed. After a change is made in a database to an access control list (ACL) governing access to a secured component of a data object, an exporting nexus sends an ACL change network message to an importing nexus. The ACL change message includes information that importing nexus can use to apply the ACL change to the importing database. Applying the ACL change message includes using the information in the ACL change message to determine which change records for which secured components of the data object in the importing database the ACL change should be applied to. By doing so, user access to all change records in the importing database to which the ACL change is applied is governed by the new ACL, thereby preventing unauthorized access to the change records, including historical change records.

20 Claims, 6 Drawing Sheets

| operation | obj_comp_id | obj_id | logical_clk | deleted | <values> |
|---|---|---|---|---|---|
| Create | 10 | 10 | 1 | 0 | Type:Person |
| Create | 101 | 10 | 1 | 0 | Name: John Smith |
| Create | 102 | 10 | 2 | 0 | Phone#: 415-222-1234 |
| Edit | 101 | 10 | 3 | 0 | Name: Jonathan Smith |
| Delete | 102 | 10 | 4 | 1 | Phone#: 415-222-1234 |

FIG. 5

TECHNIQUES FOR REPLICATING CHANGES TO ACCESS CONTROL LISTS ON INVESTIGATIVE ANALYSIS DATA

FIELD

Computer-implemented techniques are disclosed which generally relate to replication of database data, and more particularly to computer-implemented techniques for replicating changes to access control lists on investigative analysis data.

BACKGROUND

Making investigative decisions, especially those that have the potentially to impact lives and communities, requires access to up-to-date and accurate investigative information. Unfortunately, investigative information is often spread across multiple databases, computers, geographies, and clearance levels. For investigative organizations such as intelligence, defense, and law enforcement organizations to be successful, they need ways to share and find information quickly so that critical decisions can be made in time for them to have impact.

One possible solution for sharing investigative data between investigative teams is to use a multimaster database system. In a multimaster database system, investigative data is stored in a group of databases which may be geographically distributed and interconnected by one or more data networks. Data changes may be made to any database of the group. Data changes made to one database are propagated over a data network by a software process to the rest of the group. Multimaster database systems typically employ either a "synchronous" or an "asynchronous" replication scheme for propagating database changes.

In synchronous multimaster replication, each change is applied to all databases in the group immediately or to none of the databases if one or more of the databases in the group cannot accept the change. For example, one of the databases may be offline or unavailable.

In contrast, in asynchronous multimaster replication, a change made to a database is immediately accepted by the database but propagation of the change to other databases in the group may be deferred. Because propagation of changes may be deferred, if a database in the group is unavailable, the available databases can still accept changes, queuing the changes locally until they can be propagated. For this reason, multimaster database systems employing an asynchronous replication strategy are considered to be more highly available than multimaster database systems employing a synchronous replication strategy. However, since asynchronous replication raises the possibility of "concurrency conflicts" that occur as a result of concurrent database changes to multiple database of the group, multimaster database systems employing an asynchronous replication scheme are generally considered to be more complex to design, maintain and operate than those employing a synchronous replication scheme. Despite the extra complexity, asynchronous replication is often preferred in the investigative analysis context where investigative analysis teams can be dispersed throughout the world and connected to one another by unreliable network connectivity. Using an asynchronous replication scheme allows an investigative team to update investigative data in their local database even if network connectivity is not currently available. When network connectivity becomes available, the team can share their updates with other teams and receive the other teams' updates made in the interim.

A concurrency conflict can occur in a multimaster system employing an asynchronous replication scheme when the same data is changed in two databases before either one of those data changes can be propagated to the other. For example, assume that at database A, data representing a particular person's eye color is changed to "brown", and after that data change but before that data change can be propagated to database B, data at database B representing the same particular person's eye color is changed to "green". Without additional information, it is unclear which data change is the "correct" change that should be adopted by database A and database B.

Typically, a multimaster system employing an asynchronous replication scheme provides a mechanism for "deconflicting" concurrency conflicts. In many cases, deconflicting a concurrency conflict involves detecting and resolving the concurrency conflict such that the resolution of concurrency conflict is adopted at all databases in the group. In some cases, the multimaster system may be able to deconflict a concurrency conflict automatically without requiring user intervention. In other cases, user intervention is required to decide which of the concurrent data changes should be adopted as the "correct" data change.

One possible approach for detecting concurrency conflicts in a multimaster system employing asynchronous replication is through the use of version vectors (sometimes referred to as vector clocks). A version vector is a mechanism for ordering changes to database data that works by tracking "causality" relationships between changes. In particular, version vectors allow the system to determine if one change "happened before", "happened after", or "happened concurrently with" another change, even if the two changes were made to different databases at different times. Further information on using version vectors to track causality relationships between database changes in a multimaster database system is available on the Internet at wiki/Version_vector in the en.wikipedia.org domain, the entire contents of which is hereby incorporated by reference.

"Revisioning" adds an additional layer of complexity to multimaster asynchronous replication on top of the complexity of detecting concurrency conflicts. In particular, "revisioning" databases in the replication group may each maintain an online history of database changes. Maintaining a historical record of changes as opposed to just the latest changes is useful in the investigative analysis context because it allows investigators to determine "what was known when", where the "when" can be a point in time in the past. For example, a revisioning database may store two change records CR1 and CR2 for a suspect of a criminal investigation where initially it was thought the suspect is residing in Los Angeles, Calif., USA as indicated by change record CR1 but it is now thought that the suspect resides in Sacramento, Calif., USA as indicated by change record CR2. When replicating a change to a revisioning database to another revisioning database, it may be desirable that the history of changes exist in both databases after the replication has occurred. For example, if the "current possible location" property of the criminal suspect is changed in revisioning database D1 from "Los Angeles, Calif., USA" to "Sacramento, Calif., USA" and that change is replicated to revisioning database D2, it may be desirable that the change records C1 and C2 for the suspect in revisioning database D2 indicate that the prior value for the property was "Los Angeles, Calif., USA" and the current value for the property is "Sacramento, Calif., USA" respectively.

Access control adds yet another layer of complexity to multimaster asynchronous replication. In particular, change records in a revisioning database can be associated with an access control list that governs access to the change records. Such access may include reading the change records. For example, an access control list ACL1 associated with the change records CR1 and CR2 for the criminal suspect in revisioning database D1 may specify that both user Alice and user Bob currently have read access to the change records C1 and C2. Thus, both Alice and Bob can determine from the change records C1 and C2 in database D1 that the prior value for the "current possible location" property was "Los Angeles, Calif., USA" and the current value for the property is "Sacramento, Calif., USA". If an access control list associated with a set of change records is changed in one database and that change is replicated to another database, it may be desirable for security purposes that the access control list resulting from the change apply to all change records, including historical ones, in the other database. For example, if the access control list ACL1 is changed in database D1 to remove Bob and that change is replicated to database D2, it may be desirable, for security purposes, that after the change is applied to database D2, user Bob can no longer read change records C1 or C2 in database D2.

BRIEF DESCRIPTION OF THE DRAWINGS

FIG. 5 is a block diagram illustrating an example revisioning database table storing change records according to an embodiment of the invention.

DETAILED DESCRIPTION

Figure 1:
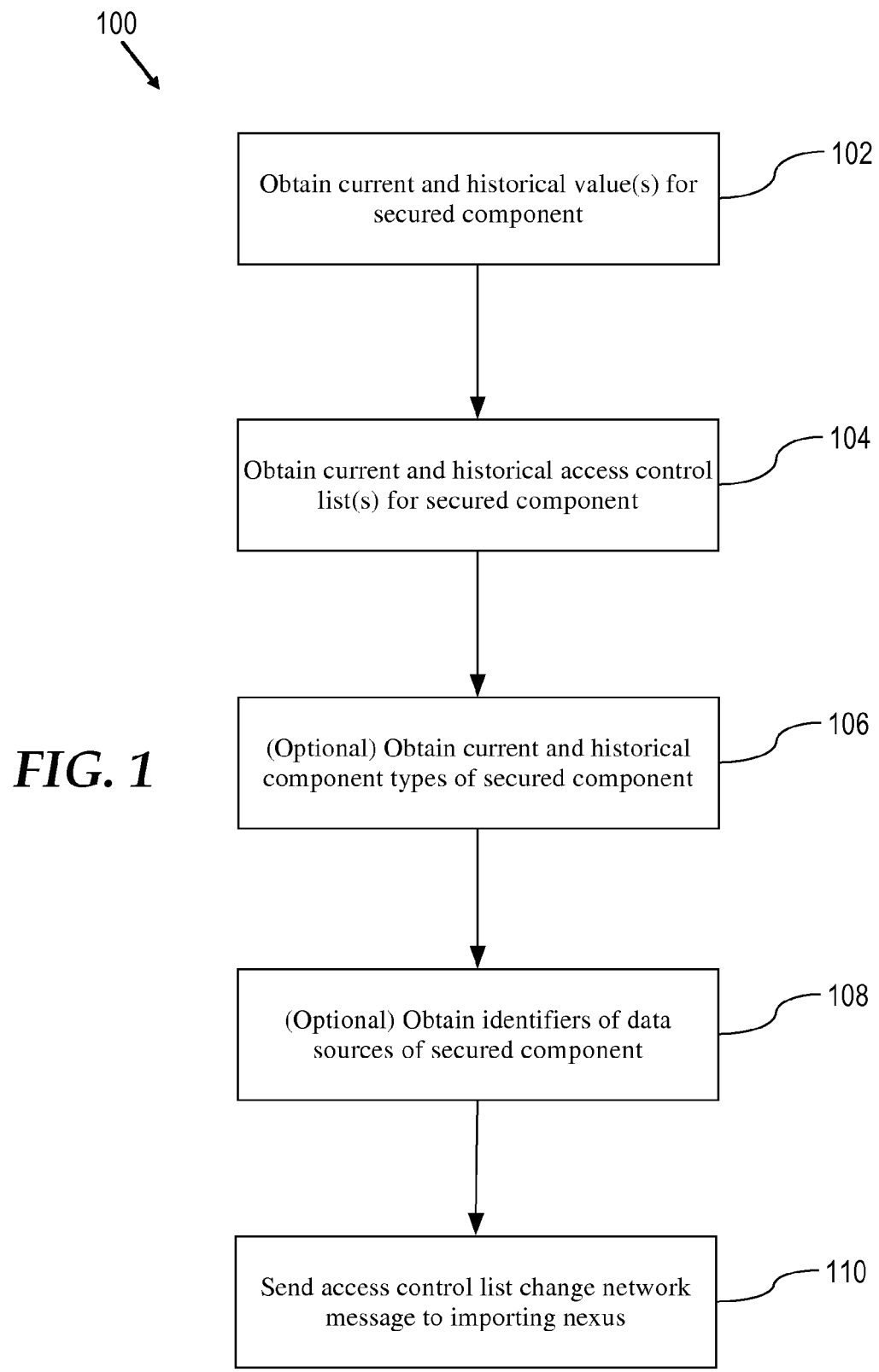
FIG. 1 is a flowchart of a software-implemented process performed by an exporting nexus according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques for replicating changes to access control lists on investigative analysis data are disclosed. In some embodiments, after a change is made in a database to an access control list (hereinafter just "ACL") governing access to a secured component of a data object, an "exporting nexus" sends an ACL change network message (hereinafter just "ACL change message") to an "importing nexus". For example, the exporting nexus may send the ACL change message to the importing nexus as part of an asynchronous data replication process. The term "nexus" is more formally defined below but generally refers to software or other computer-executable logic that operates on a database, for example, as part of database management software or an application thereof. For sake of clarity, the database that the exporting nexus operates on and from which the change to the ACL is exported as the ACL change message is referred to hereinafter as the "exporting database" and the database that the importing nexus operates on and to which the ACL change message is applied to referred to hereinafter as the "importing database".

The ACL change message includes information that the importing nexus can use to apply the ACL change to the importing database. Applying the ACL change message includes using the information in the ACL change message to determine which secured components of the data object in the importing database that the ACL change should be applied to. The terms "data object" and "secured component" are defined in greater detail below. However, a data object generally refers to data that represents a thing in the real word such as a person, place, or event and a secured component represents data associated with a data object and to which access is governed by an access control list. Examples of a secured component include a property (e.g., a person's hair color) of a data object, a note (e.g., a piece of text) associated with a data object, and a piece of media (e.g., video or audio) associated with a data object.

The exporting database and the importing database can be revisioning databases. That is, both databases may maintain histories of changes to secured components in the form of change records for each of the secured components. As mentioned, applying the ACL change message includes using the information in the ACL change message to determine which secured components of the data object in the importing database the ACL change should be applied to. This applying includes using the information in the ACL change message to determine which change records for which secured components of the data object in the importing database the ACL change should be applied to. By doing so, user access to all change records in the importing database to which the ACL change is applied is governed by the new ACL, thereby preventing unauthorized access to the change records, including historical change records.

Nexus

Computer databases are a common mechanism for storing information on computer systems at replication sites while providing access to the stored information to users. A typical database is an organized collection of information stored as "objects" or "records" having "properties" or "fields". As an example, a database of criminal suspects may have an object for each suspect where each object contains properties designating specifics about the suspect, such as eye color, hair color, height, sex, etc.

Operating on the actual database itself (i.e., the organized information actually stored on a storage device) there is typically a software-based database management system or DBMS that, among other operations, processes requests from users for access to information in the database. Users may interact indirectly with the DBMS through a database application that in turn interacts directly with the DBMS to provide high level database operations to users, such as analyzing, integrating, and visualizing database information. However, the distinction between DBMS and database application is not clear cut and functionality provided by one may be provided by the other. Consequently, in this description, the term "nexus" is used to refer broadly to any software that operates directly or indirectly on the actual database itself. A nexus may include a DBMS, a database application or applications, or components thereof.

Exporting Nexus Process

FIG. 1 is a flowchart 100 of a software-implemented process performed by an exporting nexus according to an embodiment of the present invention. For example, the process may be performed after an ACL associated with a secured component of a data object has been changed in the exporting database. The ACL change may be made by a user or a computing process. The ACL change may involve creating a new ACL for the secured component or modifying an existing ACL for the secured component. The process may be performed by the exporting nexus to inform an importing nexus about the ACL change so that the importing nexus can appropriately apply the ACL change to the importing database.

The exporting nexus process generally involves collecting information pertaining to the ACL change from the exporting database and sending the information in an ACL change message to the importing nexus. The information collected is information that the importing nexus can use to identify which change records in the importing database to apply the ACL change to. The process does not require the importing database and the exporting database to have corresponding identifiers or external identifiers for change records or secured components. Thus, the importing database and the exporting database may use different internal identifiers for change records and secured components. In other words, the internal identifiers are not required to have inherent correspondence between the databases.

While steps of the exporting nexus process are depicted and described as being performed in a certain order, some or all of the steps are performed in a different order and/or performed concurrently with one another in other embodiments.

At step 102, the current value and one or more historical values of the secured component are obtained from the change records in the exporting database for the secured component. In some embodiments, all available historical values of the secured component are obtained from the exporting database.

At step 104, the current ACL and one or more historical ACLs associated with the secured component are obtained from the exporting database. In some embodiments, all available historical ACLs associated with the secured component are obtained from the exporting database. Over time, the ACL associated with a secured component may change more frequently than the value of the secured component. Thus, there may be more historical ACLs obtained at step 104 then historical values obtained at step 102. Similarly, over time, the value of the secured component may change more frequently that the ACL associated with the secured component. Thus, there may be more historical values obtained at step 102 than historical ACLs obtained at step 104.

At optional step 106, the current component type of the secured component and one or more historical component types of the secured component are obtained from the exporting database. Over time, the component type associated with a secured component may change more frequently than the value of the secured component. Thus, there may be more historical component types obtained at optional step 106 then historical values obtained at step 102. Similarly, over time, the value of the secured component may change more frequently that the component type of the secured component. Thus, there may be more historical values obtained at step 102 than historical component types obtained at step 106. In some embodiments, a component type is expressed in the form of a Uniform Resource Indicator (URI). A component type URI may identify the data type of the secured component according to a data type ontology used by the exporting nexus. A component type URI may be used for value transformations if the exporting nexus and the importing nexus support cross-ontology replication. Further information on using component type URIs for cross-ontology multimaster replication can be found in related U.S. patent application Ser. No. 13/076,804, entitled "Cross-Ontology Multi-Master Replication", and filed Mar. 31, 2011, the entire contents of which is hereby incorporated by reference as if fully set for herein.

At optional step 108, global identifiers of data sources for the secured component are obtained from the exporting database. A "data source" is a single source of data for a secured component. For example, a data source can be a person who manually enters the secured component data or a document, spreadsheet, database, or other digital information from which the secured component data was extracted, parsed, or derived from. A secured component can have multiple data sources. The global identifiers of the data source may be meaningful to both the exporting nexus and the importing nexus. That is, the global data source identifiers may unambiguously identify data source records in both the exporting system and in the importing system. Such data source records may be associated in the importing system with their own ACLs separate from the ACLs associated with secured components.

In some embodiments, the importing nexus uses the global data source identifiers to identify data source ACLs in the importing database to which ACL change should be applied. In some embodiments, in addition to obtaining global identifiers of data sources for the secured component from the exporting database, addition information about how the secured component data was obtained from the data sources is also obtained from the exporting database. For example, the additional information may include a page number or index of a document from which the secured component data was obtained, if the secured component is a document type, or a video frame number from which secured component video data was obtained, if the secured component is a video type. The additional information can be used to prevent false positive matches when importing the ACL change into the importing database.

At step 110, the information collected in steps 102, 104, 106 (if performed), and 108 (if performed) is sent to the importing nexus over a data network in an ACL change message. The ACL change message may be sent as part of a periodic asynchronous replication process performed by the exporting nexus. The exporting nexus may perform the replication process to inform the importing nexus of changes, including ACL changes, to the exporting database that have occurred since the exporting nexus last performed the replication process with the importing nexus. In some embodiments, the ACL change message and the information contained therein is formatted according to the eXtensible Markup Language (XML). However, other data encoding formats or other markup language formats may be used. For example, the ACL change message can be formatted with a protocol buffer. Further information on protocol buffers can be found on the Internet at wiki/Protocol_Buffers in the en.wikipedia.org domain, the entire contents of which is hereby incorporated by reference.

Importing Nexus Process

Figure 2:
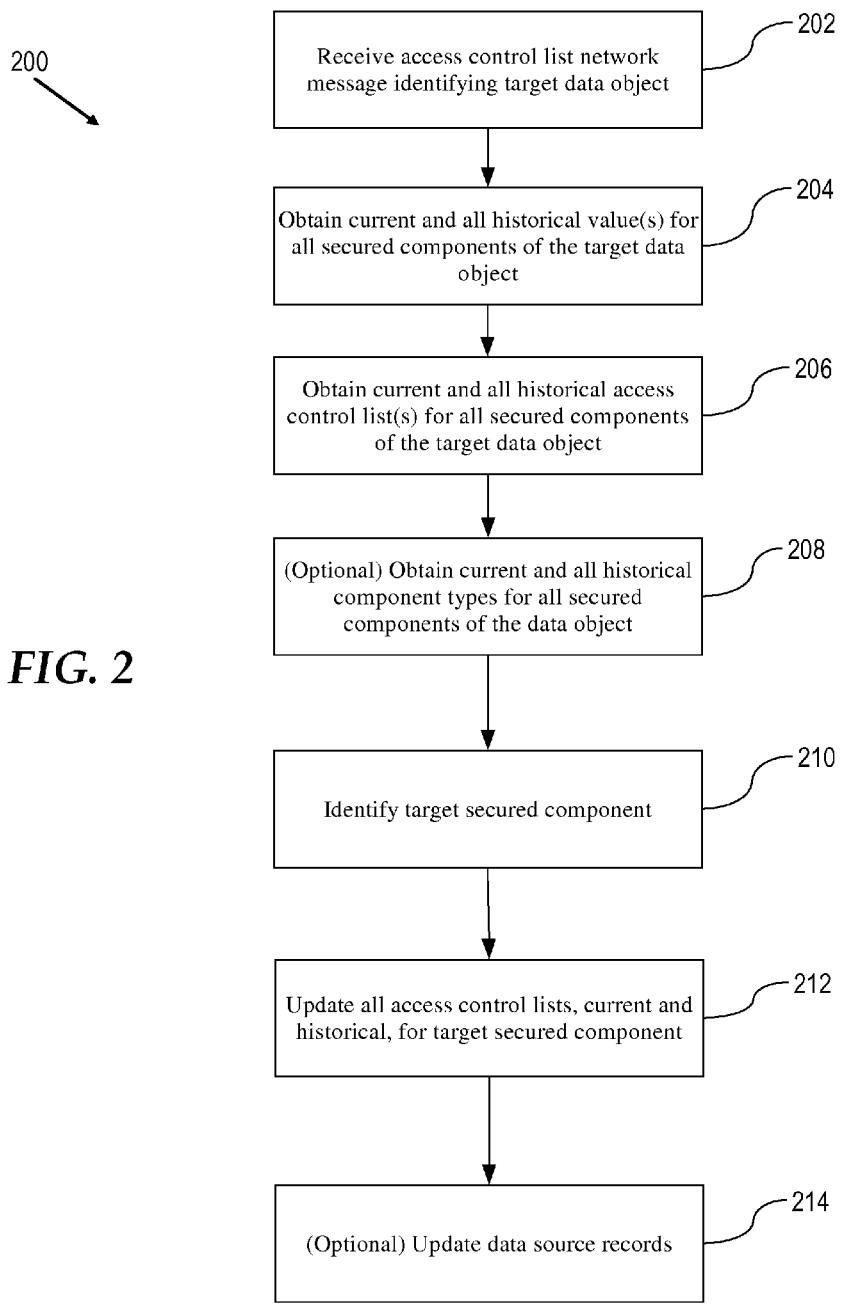
FIG. 2 is a flowchart of a software-implemented process performed by an importing nexus according to an embodiment of the present invention.

FIG. 2 is a flowchart 200 of a software-implemented process performed by an importing nexus according to an embodiment of the present invention. The process may be performed by the importing nexus after the exporting nexus has sent an ACL change message to it, the ACL change message pertaining to an update to an ACL on a secured component in the exporting database. For purposes of providing clear examples, the secured component in the exporting database to which the ACL change message pertains is referred to in this section as the "exported" secured component and the data object that the exported secured component is a part of or associated with is referred to in this section as the "target" data object (or target data objects). Recall that secured components and associated change records in the exporting database and the importing database may not have corresponding identifiers. That is, it may not be possible to determine solely from the identifier of a secured component in one of the databases which secured component in the other database corresponds to it. Each of the exporting database and the importing database may use internal non-corresponding identifiers for identifying secured components so that assignment of identifiers to secured component does not require coordination between nexuses and so that the internal identifiers are not required to have a minimum data (byte) length to ensure uniqueness across the databases.

While steps of the importing nexus process are depicted and described as being performed in a certain order, some or all of the steps are performed in a different order and/or performed concurrently with one another in other embodiments.

At step 202, the importing nexus receives the ACL change network message sent to it by the exporting nexus. In some embodiments, the received ACL change network message contains a global identifier of the target data object.

The ACL change messages contains a set of values of the exported secured component including a current value and one or more historical values of the exported secured component ("exported values"). The exported values may be ordered or arranged by age with the current value being first (or last) in the order and the oldest value in the set of exported values being last (or first) in the order.

The ACL change message also contains a set of ACLs associated with the exported secured component including a current ACL and one or more historical ACLs associated with the exported secured component ("exported ACLs"). The exported ACLs may be ordered or arranged by age with the current ACL being first (or last) in the order and the oldest ACL in the set of exported ACLs being last (or first) in the order.

The ACL change message may also contain a set of component types associated with the exported secured component including a current component type and one or more historical component types associated with the exported secured component ("exported component types"). The exported component types may be ordered or arranged by age with the current component type being first (or last) in the order and the oldest component type in the set of exported component types being last (or first) in the order.

The ACL change message may also a set of data source identifiers associated with the exported secured component ("exported data source identifiers").

At step 204, the importing nexus obtains, from the importing database, all values, current and historical, for all secured components of the target data object in the importing database ("candidate values").

At step 206, the importing nexus obtains, from the importing database, all ACLs current and historical, associated with all secured components of the target data object in the importing database ("candidate ACLs").

At optional step 208, the importing nexus obtains, from the importing database, all component types, current and historical, of all secured components of the target data object in the importing database ("candidate component types").

At step 210, the target secured component from all secured components of the target data object in the importing database is identified in the importing database. Generally, this identification process proceeds by iterating over all secured components of the target data object in the importing database one-by-one until the target secured component is identified (at which point the remaining secured components need not be iterated over because the target data object has been identified). For each secured component iterated over, a comparison is performed. The comparison involves comparing the exported values to the candidate values of the current secured component. If there is a match, then the comparison further involves comparing the exported ACLs to the candidate ACLs of the current secured component. If there is still a match, then the current secured component may be identified as the target secured component. In some embodiments, the current secured component is not identified as the target secured component unless also there is a match between the exported component types and the candidate component types of the current secured component.

At step 212, the ACLs, current and historical, associated with target secured component in the importing database are updated in the importing database. This updating may include replacing, in the importing database, all of the ACLs, current and historical, associated with the target secured component in the importing database with the current ACL from the exported ACLs. By doing so, all values, current and historical, of the target secured component in the importing database are protected in the importing database by the current ACL from the exported ACLs.

At optional step 214, if the ACL change message contains the exported data source identifiers, then all ACLs in the importing database associated with the identified data source records are replaced with the current ACL from the exported ACLs. By doing so, all of the identified data source records are also protected in the importing database by the current ACL from the exported ACLs.

Object-Centric Data Model

Figure 3:
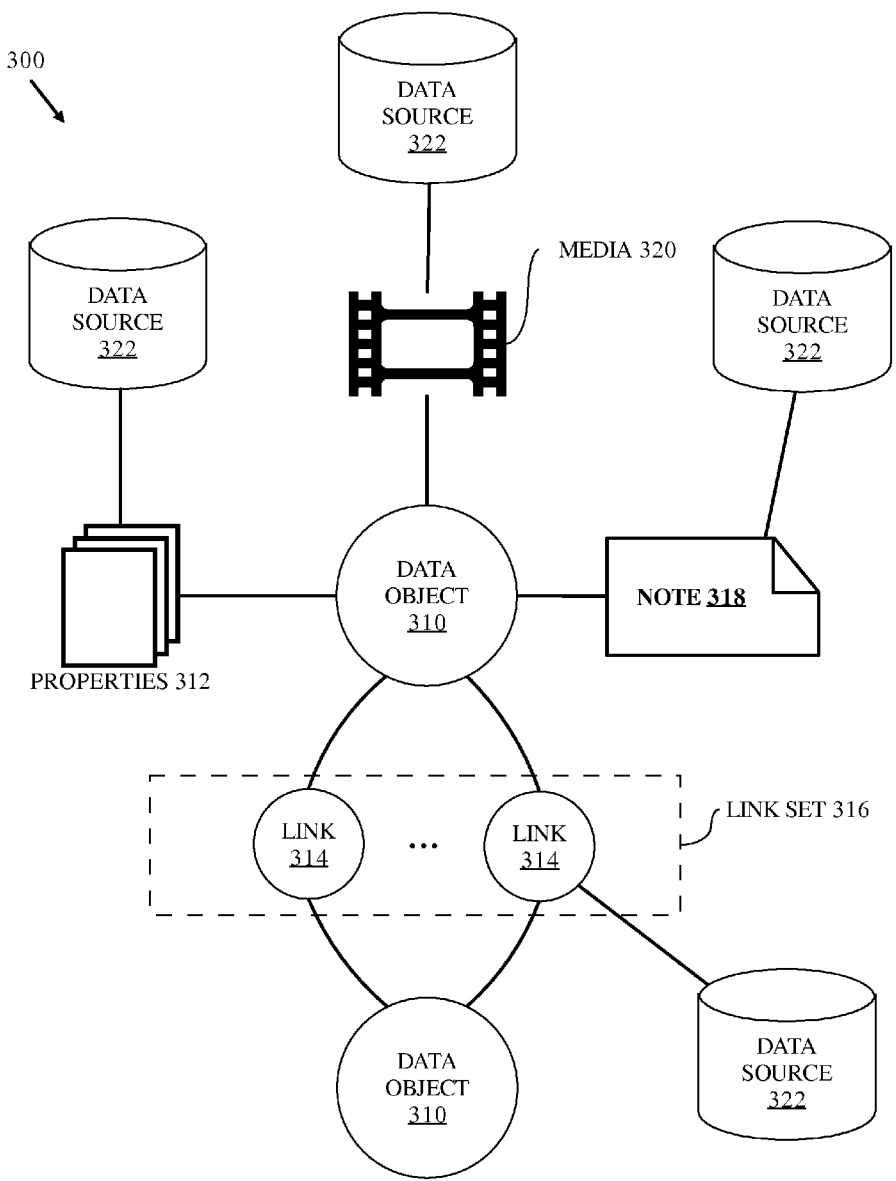
FIG. 3 is a block diagram illustrating an object-centric data model according to an embodiment of the present invention.

Investigative analysis data stored in the exporting database or the importing database may be conceptually stored and organized according to an object-centric data model. FIG. 3 illustrates an object-centric conceptual data model 300. Model 300 is centered on the notion of a data object 310. It should be noted that the particulars of the data model 300 are not to be confused with the particulars of how the investigative analysis data is stored in the exporting database or the importing database which may be varied and depend on the type of the database according to the requirements of the particular implementation at hand. For example, if the importing database and the exporting database are relational databases, then data organized according to data model 300 may be stored in the exporting database and the importing database as one or more rows of one or more database tables.

At the highest level of abstraction, a data object 310 is a container for information representing things in the world. For example, a data object 310 can represent an entity such as a person, a place, an organization, or other noun. A data object 310 can represent an event that happens at a point in time or for a period of time. A data object 310 can represent a document or other unstructured data source such as an e-mail message, a news report, or a written paper or article. These are just some example of what a data object 310 can represent. A data object 310 may be associated with a unique identifier that uniquely identifies the data object within the exporting database and the importing database. A data object 310 may also have a type (e.g., Person, Event, or Document) and a display name which may be the value of a particular property of the data object 310.

A data object 310 can have or be associated with a number of secured components including one or more properties 312, one or more links 314, a linkset 316, a note 318, and media 320.

A property 312 may have a type, name, and a value. Different types of data objects 310 may have different types of properties 312. For example, a Person data object 310 might have an Eye Color property 312 and an Event data object 310 might have a Date property 312. In some embodiments, the set of data object types and the set of property types for each type of data object 310 supported by the exporting database and the importing database are defined according to a pre-defined, user-defined, or dynamically-defined ontology or other hierarchical structuring of knowledge through sub-categorization of object types and property types according to their relevant and/or cognitive qualities. In some embodiments, the importing database and the exporting database use different ontologies and replication between the exporting nexus and the importing nexus is accomplished across the differing ontologies. For example, such cross-ontology multi-master replication may be accomplished using the techniques described in related U.S. patent application Ser. No. 13/076,804, entitled "Cross-Ontology Multi-Master Replication", and filed Mar. 31, 2011, the entire contents of which is hereby incorporated by reference as if fully set for herein. In some embodiments, data model 300 supports property multiplicity. In particular, a data object 310 may be allowed to have more than one property 312 of the same type. For example, a Person data object 310 might have multiple Address properties 312 or multiple Name properties 312.

A link 314 represents a connection between two data objects 310. In some embodiments, the connection is either through a relationship, an event, or through matching properties 312. A relationship connection may be asymmetrical or symmetrical. For example, Person data object A 310 may be connected to Person data object B 310 by a Child Of relationship (where Person data object B 310 has an asymmetric Parent Of relationship to Person data object A 310), a Kin Of symmetric relationship to Person data object C 310, and an asymmetric Member Of relationship to Organization data object X 310. The type of relationship between two data objects 310 may vary depending on the types of the data objects 310. For example, Person data object A 310 may have an Appear In relationship with Document data object Y 310 or have a Participate In relationship with Event data object E 310. As an example of an event connection, two Person data objects 310 may be connected by an Airline Flight data object 310 representing a particular airline flight if they traveled together on that flight, or by a Meeting data object 310 representing a particular meeting if they both attended that meeting. In some embodiments, when two data objects 310 are connected by an event, they are also connected by relationships, in which each data object 310 has a specific relationship to the event, such as, for example, an Appears In relationship. As an example of a matching properties 312 connection, two Person data objects 310 representing a brother and a sister, may both have an Address property 312 that indicates where they live. If the brother and the sister live in the same home, then their Address properties 312 likely contain similar, if not identical information. In some embodiments, a link 214 between two data objects 310 may be established based on similar or matching properties 312 of the data objects 310. The above are just some examples of the types of connections that may be represented by a link 314 and other types of connections may be represented. Thus, it should be understood that embodiments of the invention are not limited to any particular types of connections between data objects 310. For example, a document might contain two different tagged entities. A link 314 between two data objects 310 may represent a connection between these two entities through their co-occurrence within the same document.

A data object 310 can have multiple links 314 with another data object 310 to form a link set 316. For example, two Person data objects 310 representing a husband and a wife could be linked through a Spouse Of relationship, a matching property (Address) 312, and an event (Wedding).

A note 318 is a piece of text associated with a data object 310. For example, a note 318 may be free-form text entered by an investigator that is associated with a data object 310.

Media 320 is arbitrary binary data such as an image, a video, or audio associated with a data object 310.

Each secured component may be associated with a data source 322. Specifically, each property 312, each media 320, each note 318, and each link 314 in the exporting database and the importing database may be associated with a data source 322 through a data source record. A data source 322 is the source of the data of the associated secured component. Example data sources 322 include user entered data, a document, and a database.

Access Control List

Figure 4:
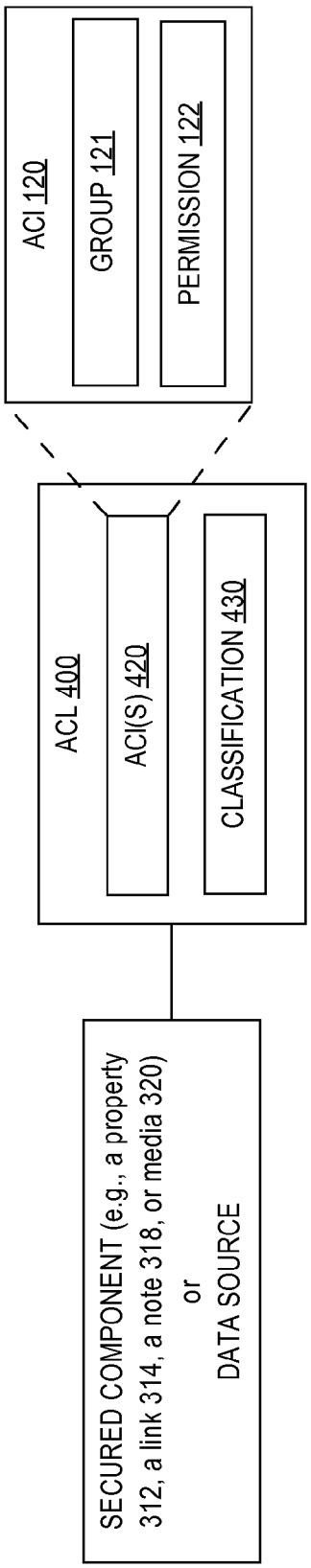
FIG. 4 is a block diagram illustrating an example access control list according to an embodiment of the invention.

FIG. 4 is a block diagram illustrating an example access control list (ACL) 400 according to an embodiment of the invention. ACL 400 may be associated with a secured component of a data object in the exporting database or the importing database. The exporting database and the importing database may store change records for an ACL 400 as well as storing change records for the secured component the ACL 400 is associated with. By doing so, the current ACL 400 for a secured component can be determined as well as previous versions of the ACL 400 associated with the secured component. In some embodiments, a data source 322 is also associated with its own ACL 400 separate from the ACLs 400 associated with the secured components that are associated with the data source 322.

In some embodiments, an ACL 400 may include a set of zero or more access control items (ACI) 420 and zero or one classification 430. Typically, an ACL 400 will include at least one ACI 420 or a classification 430 or include at least one ACI 420 and a classification 130.

Each ACI 420 specifies a group 421 and a permission 422 of that group 421. A group 121 may also be referred to a role. The group 421 of an ACI 420 identifies a set of users. The permission 422 of the ACI 420 identifies an operation a user in the group can perform on the associated secured component or an operation the user can perform on the ACL 400. Non-limiting examples of a permission 422 include read, write, owner, create, delete, etc.

According to some embodiments, if an ACL 400 has a classification 430, then a user must be authorized for each and every classification marking in the set of classification markings of the classification 430 to have any access to the associated secured component or the ACL 400. Thus, the classification 430 overrides any permission 422 granted to the user that would otherwise allow the user to access the associated secured component or the ACL 400.

A classification marking is data associated with sensitive information in a database that indicates a necessary classification marking a user must be authorized for in order to access the sensitive information. The possible classification markings are typically specific to a particular classification scheme and may be hierarchical according to authorization level. For example, one classification scheme may have as the highest classification marking, Top Secret (TS), followed by Secret (S), followed by Confidential (C), followed by Restricted (R), and finally Unclassified (U). A user authorized for classification marking Secret (S) can access sensitive information with a classification marking of Secret (S), Confidential (C), Restricted (R), or Unclassified (U) but not Top Secret (TS). The foregoing classification markings are NOTIONAL ONLY and provided solely for example purposes.

Revisioning Database

The exporting nexus and the importing nexus may use or implement a revisioning database system for tracking changes made to investigative analysis data stored in the exporting database and the importing database respectively. Thus, the exporting database and the importing database may each be considered to be a revisioning database. In some embodiments, the revisioning database system is implemented as an application on top of a conventional database management system (not shown). For example, the database management system may be a relational database management system such as those commercially available from the Oracle Corporation of Redwood Shores, Calif. and the Microsoft Corporation of Redmond, Wash.

In one aspect, the revisioning database system differs from other types of database systems in that the revisioning database system is capable of answering a query about the state of investigative analysis data stored in a revisioning database at a point in time in the past as opposed to only being able to answer a query about the current state of the investigative analysis data. With the revisioning database system, investigative analysts can determine when a particular piece of data was added or edited in a revisioning database. Thus, the revisioning database system, as a result of its capability to track changes to investigative analysis data stored in a revisioning database, enables investigative analysts to determine what was known when.

In some embodiments, revisioning database system is capable of tracking all changes made to investigative analysis data over a period of time. To do so, the revisioning database system creates a new database change record in a revisioning database for every creation, edit, or deletion of a secured component (e.g., a property 312, a link 314, a note 318, and media 320), an ACL 400, and a data source 322. To track the ordering of the changes, the revisioning database system employs an always increasing logical clock that models all of the changes as a linear sequence of database events. The logical clock provides a total ordering for all changes. In addition, the logical clock provides atomicity for changes as multiple changes can occur at the same point in the linear sequence of database events represented by the logical clock (and hence be associated with the same logical clock value).

FIG. 5 is a block diagram a illustrating an example database table 500 in a revisioning database for tracking changes made data objects 310 according to an embodiment of the invention. Separate similar or analogous database tables may be used for tracking changes to properties 312, links 314, notes 318, media 320, ACLs 400, and data sources 322. Generally, a change record indicates the change operation performed (e.g., create, edit, or delete), the secured components, ACL, or data source that was changed, and data representing the result of the change (e.g., the value created, edited, or deleted).

For example, each change record 518, 520, 522, 524, and 526 in table 500 represents a creation, edit, or deletion of a data object 310 or a creation, edit, or deletion of a property 312 of a data object 310. The fields of each change record include a 'obj_comp_id' field identifying the data object 310 or property 312 that was created, edited, or deleted by the change, an 'obj_id' field identifying the data object 310 that was created, edited, or deleted by the change, a 'logical_clk' field that identifies the order of the change in a total ordering of all changes made to the revisioning database containing table 500, a 'deleted' field indicating whether the change was a deletion of a data object 310 or a property 312, and a '<values>' field indicating, for changes that create or edit a value, the value that resulted from the change or, for changes that delete a value, the value that was deleted.

For example, referring to FIG. 5, at logical clock event 1, a data object 310 of type "Person" was created. Also at logical clock event 1, a "Name" property 312 of the Person data object 310 was created and given the value "John Smith". Later, at logical clock event 2, a "Phone #" property 312 of the object was created and given the value "415-222-1234". At logical clock event 3, the "Name" property 312 of the Person data object 310 that was created at logical clock event 2 was edited with the value "Jonathan Smith". At logical clock event 4, the "Phone #" property 312 that was created at logical clock event 3 was deleted. As a result of the changes at logical clock events 1, 2, and 3, the state of the object at logical clock event 4 is an object 310 of type "Person" with the property "Name" 312 having a value "Jonathan Smith".

By preserving all changes made to an object 310 in the form of change records, the revisioning database system is able to provide the state of an object 310 at a point in time in the past. For example, referring again to FIG. 5, it can be seen from change records 518, 520, and 522 that the state of the object with obj_id=10 at logical clock event 2 was an data object 310 of type "Person" with a property "Name" 312 having a value "John Smith" and a property "Phone#" 312 having a value "415-222-1234".

Note that while table 500 contains change records for only one data object 310 with an identifier of 10, table 310 could contain change records for multiple data objects.

FIG. 5 illustrates but one example scheme that the revisioning database system could employ to track changes to a revisioning database. However, the invention should not be construed as being limited to only the one example scheme or be construed as requiring all details of the one example scheme. For example, instead of storing change records for all data objects 310 in a single table as depicted in FIG. 5, the change records might be stored across multiple tables. Further, the change records may contain other fields that are not depicted in FIG. 5. For example, each change record may have an additional version field that serves as a single primary key for the change record as opposed to using a combination of the 'obj_comp_id' and the 'logical_clk' fields as the primary key.

Example Implementing Mechanism

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
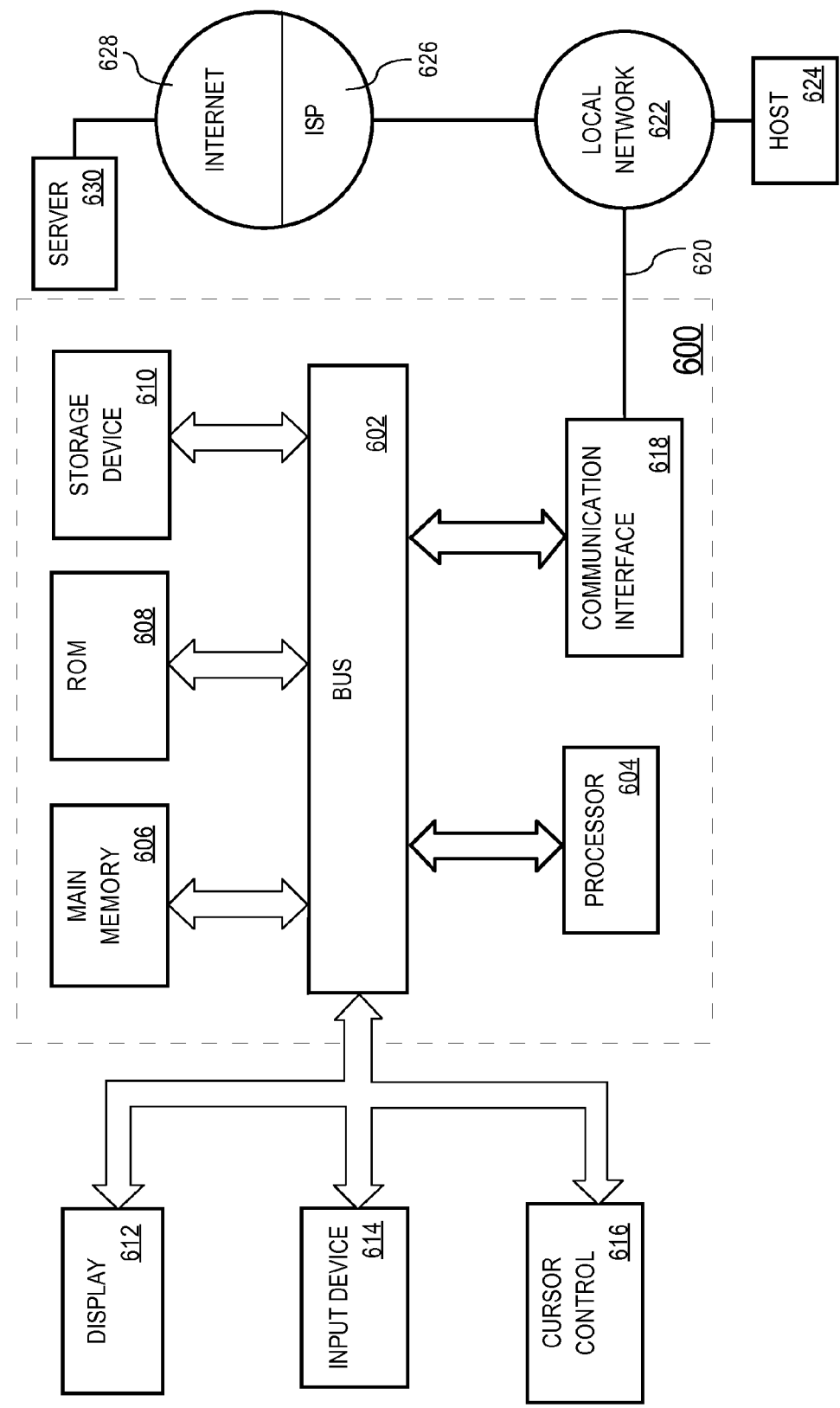
FIG. 6 is a block diagram illustrating a computer system on which embodiments of the invention may be implemented.

For example, FIG. 6 illustrates a computer system upon which one or more embodiments may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A system comprising:
   one or more computing devices configured to execute a first nexus that operates on a first database;
   one or more computing devices configured to execute a second nexus that operates on a second database;
   the first nexus configured:
      to store first value data in the first database, the first value data comprising a current value and one or more historical values of a first secured component of a data object, the first secured component associated in the first database with a first secured component identifier, the data object associated in the first database with a data object identifier;
      to store first access control list data in the first database, the first access control list data comprising a current access control list and one or more historical access control lists governing, with respect to the first database, access to the current value and the one or more historical values of the first secured component; and
      to send one or more network messages to the second nexus, the one or more network messages comprising the data object identifier, the first value data, and the first access control list data;
   the second nexus configured:
      to store second value data in the second database, the second value data comprising a current value and one or more historical values of a second secured component of the data object, the second secured component associated in the second database with a second secured component identifier that is different than the first secured component identifier, the data object associated in the second database with the data object identifier;
      to store second access control list data in the second database, the second access control list data comprising a current access control list and one or more historical access control lists governing, with respect to the second database, access to the current value and the one or more historical values of the second secured component;
      to receive the one or more network messages;
      to compare the first value data to the second value data;
      to compare the first access control list data to the second access control list data; and
      responsive to determining that the first value data matches the second value data and the first access control list data matches the second access control list data, to replace, in the second database, each of the current access control list and the one or more historical access control lists in the second access control list data with the current access control list from the first access control list data.

2. The system of claim 1, wherein change records for the first secured component are identified in the first database using a first identifier, wherein change records for the second secured component are identified in the second database using a second identifier, wherein the first identifier cannot be used to identify, in the second database, change records for the second secured component, and wherein the second identifier cannot be used to identify, in the first database, change records for the first secured component.

3. The system of claim 1:
   wherein the first nexus is further configured:
      to store first component type data in the first database, the first component type data comprising a current component type and one or more historical component types of the first secured component; and
      to send one or more network messages to the second nexus, the one or more network messages comprising an identifier of the data object, the first value data, the first access control list data, and the first component type data;
   wherein the second nexus is further configured:
      to store second component type data in the second database, the second component type data comprising a current component type and one or more historical component types of the second secured component;
      to compare the first component type data with the second component type data; and
      responsive to determining that the first value data matches the second value data, the first access control list data matches the second access control list data, and the first component type data matches the second component type data, to replace, in the second access control list data in the second database, each of the current access control list and the one or more historical access control lists in the second access control list data with the current access control list from the first access control list data.

4. The system of claim 1, wherein the first secured component and the second secured component are both properties of the data object, the first secured component and the second secured component having the same property name.

5. The system of claim 1, wherein each access control list in the first access control list data comprises one or more access control items, each access control item comprising a user or a group of users and one or more permissions of the user or the group of users with respect to the first secured component, and wherein each access control list in the second access control list data comprises one or more access control items, each access control item comprising a user or a group of users and one or more permissions of the user or the group of users with respect to the second secured component.

6. The system of claim 1, wherein the first secured component is a property, a note, or media, and wherein the second secured component is a property, a note, or media.

7. The system of claim 1, wherein the first nexus is configured to store the first value data in one or more first change records in the first database, each change record of the one or more first change records corresponding to the current value or one of the one or more historical values of the first secured component, and wherein the second nexus is configured to store the second value data in one or more change records in the second database, each change record of the one or more second change records corresponding to the current value or one of the one or more historical values of the second secured component.

8. The system of claim 1, wherein the first nexus is configured to format the one or more network messages using an eXtensible Markup Language (XML) or a protocol buffer.

9. The system of claim 1, wherein the current access control list of the second access control data is the same as the current access control list of the first access control data; and wherein the second nexus is configured to store the current access control list of the first access control data in the second database as the current access control list of the second access control data in response to receiving the one or more network messages.

10. The system of claim 1, wherein the current value of the second value data is the same as the current value of the first value data; and wherein the second nexus is configured to store the current value of the first value data in the second database as the current value of the second value data in response to receiving the one or more network messages.

11. A method comprising:
a first nexus that operates on a first database performing the steps of:
storing first value data in the first database, the first value data comprising a current value and one or more historical values of a first secured component of a data object, the first secured component associated in the first database with a first secured component identifier, the data object associated in the first database with a data object identifier;
storing first access control list data in the first database, the first access control list data comprising a current access control list and one or more historical access control lists governing, with respect to the first database, access to the current value and the one or more historical values of the first secured component; and
sending one or more network messages to the second nexus, the one or more network messages comprising an identifier of the data object, the first value data, and the first access control list data;
a second nexus that operates on a second database performing the steps of:
storing second value data in the second database, the second value data comprising a current value and one or more historical values of a second secured component of the data object, the second secured component associated in the second database with a second secured component identifier that is different than the first secured component identifier, the data object associated in the second database with the data object identifier;
storing second access control list data in the second database, the second access control list data comprising a current access control list and one or more historical access control lists governing, with respect to the second database, access to the current value and the one or more historical values of the second secured component;
receiving the one or more network messages;
comparing the first value data to the second value data;
comparing the first access control list data to the second access control list data; and
responsive to determining that the first value data matches the second value data and the first access control list data matches the second access control list data, replacing, in the second database, each of the current access control list and the one or more historical access control lists in the second access control list data with the current access control list from the first access control list data.

12. The method of claim 11, wherein change records for the first secured component are identified in the first database using a first identifier, wherein change records for the second secured component are identified in the second database using a second identifier, wherein the first identifier cannot be used to identify, in the second database, change records for the second secured component, and wherein the second identifier cannot be used to identify, in the first database, change records for the first secured component.

13. The method of claim 11, further comprising:
the first nexus performing the steps of:
storing first component type data in the first database, the first component type data comprising a current component type and one or more historical component types of the first secured component;
sending one or more network messages to the second nexus, the one or more network messages comprising an identifier of the data object, the first value data, the first access control list data, and the first component type data;
the second nexus performing the steps of:
storing second component type data in the second database, the second component type data comprising a current component type and one or more historical component types of the second secured component;
comparing the first component type data with the second component type data;
responsive to determining that the first value data matches the second value data, the first access control list data matches the second access control list data, and the first component type data matches the second component type data, replacing, in the second access control list data in the second database, each of the current access control list and the one or more historical access control lists in the second access control list data with the current access control list from the first access control list data.

14. The method of claim 11, wherein the first secured component and the second secured component are both properties of the data object, the first secured component and the second secured component having the same property name.

15. The method of claim 11, wherein each access control list in the first access control list data comprises one or more access control items, each access control item comprising a user or a group of users and one or more permissions of the user or the group of users with respect to the first secured component, and wherein each access control list in the second access control list data comprises one or more access control items, each access control item comprising a user or a group of users and one or more permissions of the user or the group of users with respect to the second secured component.

16. The method of claim 11, wherein the first secured component is a property, a note, or media, and wherein the second secured component is a property, a note, or media.

17. The method of claim 11, wherein the first nexus is configured to store the first value data in one or more first change records in the first database, each change record of the one or more first change records corresponding to the current value or one of the one or more historical values of the first secured component, and wherein the second nexus is configured to store the second value data in one or more change records in the second database, each change record of the one or more second change records corresponding to the current value or one of the one or more historical values of the second secured component.

18. The method of claim 11, wherein the first nexus is configured to format the one or more network messages using an eXtensible Markup Language (XML) or a protocol buffer.

19. The method of claim 11, wherein the current access control list of the second access control data is the same as the current access control list of the first access control data; and wherein the second nexus is configured to store the current access control list of the first access control data in the second database as the current access control list of the second access control data in response to receiving the one or more network messages.

20. The method of claim 11, wherein the current value of the second value data is the same as the current value of the first value data; and wherein the second nexus is configured to store the current value of the first value data in the second database as the current value of the second value data in response to receiving the one or more network messages.

* * * * *